(12) United States Patent
Merimaa et al.

(10) Patent No.: US 11,937,063 B2
(45) Date of Patent: Mar. 19, 2024

(54) METHOD AND SYSTEM FOR MAINTAINING TRACK LENGTH FOR PRE-RENDERED SPATIAL AUDIO

(71) Applicant: Apple Inc., Cupertino, CA (US)

(72) Inventors: Juha O. Merimaa, San Mateo, CA (US); Abdullah Fahim, Santa Clara, CA (US); Andrey D. Del Pozo, Sunnyvale, CA (US); Joshua D. Atkins, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 17/737,897

(22) Filed: May 5, 2022

(65) Prior Publication Data

US 2022/0394406 A1 Dec. 8, 2022

Related U.S. Application Data

(60) Provisional application No. 63/197,210, filed on Jun. 4, 2021.

(51) Int. Cl.
*H04R 5/02* (2006.01)
*H04S 1/00* (2006.01)
*H04S 7/00* (2006.01)
*H03G 3/00* (2006.01)

(52) U.S. Cl.
CPC .............. *H04S 1/007* (2013.01); *H04S 7/303* (2013.01); *H04S 7/305* (2013.01); *H04S 2420/01* (2013.01)

(58) Field of Classification Search
CPC .......... H04S 1/007; H04S 7/303; H04S 7/305; H04S 2420/01
USPC .................................................... 381/300, 61
See application file for complete search history.

(56) References Cited

U.S. PATENT DOCUMENTS 5,371,799 A * 12/1994 Lowe .................... H04S 1/005
381/74
2007/0276733 A1* 11/2007 Geshwind .............. G06Q 30/02
705/14.49

* cited by examiner

*Primary Examiner* — Ammar T Hamid
(74) *Attorney, Agent, or Firm* — Aikin & Gallant, LLP

(57) ABSTRACT

A method performed by a programmed processor of an audio system, the method includes receiving a sound track that has a track length, producing a binaural audio version of a sound track, the binaural audio version having an extended track length performing a fading operation upon the binaural audio version to gradually reduce a signal level of the binaural audio version to below a signal threshold level at a time along the extended track length that corresponds to an end time of the track length of the sound track; and storing the binaural audio version having the track length of the sound track in memory for later transmission to an audio playback device for driving one or more speakers.

20 Claims, 9 Drawing Sheets

METHOD AND SYSTEM FOR MAINTAINING TRACK LENGTH FOR PRE-RENDERED SPATIAL AUDIO

CROSS-REFERENCE TO RELATED APPLICATION

This application claims the benefit of and priority to U.S. Provisional Patent Application Ser. No. 63/197,210 filed Jun. 4, 2021, which is hereby incorporated by this reference in its entirety.

FIELD

An aspect of the disclosure relates to maintaining track length for pre-rendered spatial audio sound tracks. Other aspects are also described.

BACKGROUND

A binaural audio recording provides a listener with three-dimensional (3D) stereo sound that may be reproduced by a pair of speakers or headphones. To create this 3D sound, a microphone is positioned at each ear of a mannequin's head within a room to capture sound. When played back, the reproduced sound gives the listener the impression as if listening to the sound within the room in which the recording was originally made.

SUMMARY

An aspect of the disclosure is a method performed by a programmed processor of an audio system, such as a remote electronic server. The audio system receives a sound track that has a track length and produces a binaural audio version of a sound track, the binaural audio version having an extended track length. For instance, the system may produce the binaural audio version by applying at least one spatial filter (e.g., a predefined head-related transfer function (HRTF), which may be generic and not personalized for any particular user). The extended track length may be the result of the application of the HRTF and/or other audio signal processing operations, such as applying reverb and performing equalization operations. For example, the application of the operations may add a reverb tail to the sound track, resulting in the extended length. The system performs a fading operation upon the binaural audio version to gradually reduce (e.g., fade-out) a portion of the binaural audio version. For example, the fading operation may reduce a signal level of the binaural audio version to below (or equal to) a signal threshold level (e.g., 0 dB) at a time along the extended track length that corresponds to an end time of the (original) track length of the sound track. The system stores the binaural audio version having the track length of the sound track in memory for later transmission to an audio playback device for playback (e.g., driving one or more speakers). Thus, the system maintains track length between the original sound track and the binaural audio version.

In one aspect, the signal threshold level is a first signal threshold level, the system further determines whether a portion of the binaural audio version has a signal level that exceeds a second signal threshold level (e.g., such as 0 decibels relative to full scale (dBFS)), and, in response to determining that the portion exceeds the second signal threshold level, applies dynamic range compression based on a difference between the signal level of the portion and the second signal threshold level. In another aspect, the system may receive, over a computer network a request from the audio playback device to stream the binaural audio version of the sound track, retrieve the binaural audio version from memory, and transmit, over the computer network, the binaural audio version to the audio playback device. In some aspects, the system, upon performing the fading operation, trims an end portion of the binaural audio version that begins at the time along the extended track length that corresponds to the end time of the track length of the sound track so that both the sound track and the binaural audio version have a same track length.

Another aspect of the disclosure is a method performed by a programmed processor of an electronic server, the method includes receiving a sound track having a track length, applying a head-related transfer function (HRTF) upon the sound track to produce a binaurally rendered track that has an extended track length, determines whether a signal level of an end portion of the binaurally rendered track that exceeds beyond the track length of the sound track is below a signal threshold level, and, in response to the signal level of the end portion being below the signal threshold level, trimming the end portion off of the binaurally rendered track. In one aspect, determining whether the signal level of the end portion is below the signal threshold level includes determining whether an end portion of the sound track is below the signal threshold level and has a longer track length than a track length of the end portion of the binaurally rendered track. In some aspects, determining whether the signal level of the end portion is below the signal threshold level includes determining whether the end portion of the binaurally rendered track that begins at a time that corresponds to an end time of the sound track remains below the signal threshold level along its track length.

In one aspect, in response to the signal level of the end portion not being below the signal threshold level, the electronic server reduces the end portion of the binaurally rendered track by fading out a portion of the applied reverb upon the binaurally rendered track and trimming off the reduced end portion such that the binaurally rendered track has a same track length as the sound track.

Another aspect of the disclosure is a method performed by a programmed processor of an electronic server, the method includes receiving an ordered plurality of sound tracks of an audio album, each sound track having a respective track length, combining the ordered plurality of sound tracks to form a concatenation of sound tracks, spatially rendering the concatenation of sound tracks, where the spatially rendering causes at least one of the sound tracks of the concatenation to have an extended track length, separating the spatially rendered concatenation of sound tracks to form an ordered plurality of spatially rendered sound tracks, each having the respective track length of its corresponding sound track of the ordered plurality of sound tracks, where a beginning portion of a spatially rendered sound track is an end portion of a previous spatially rendered sound track that exceeded beyond its respective track length. In one aspect, separating the spatially rendered concatenation of sound tracks includes fading out a last spatially rendered sound track separated from the concatenation at a time along its respective extended track length that corresponds to an end time of a corresponding sound track of the ordered plurality of sound tracks.

Another aspect of the disclosure is a method that includes receiving a sound track having audio content, producing a binaurally rendered sound track having a same track length as the sound track and having an end portion in which reverb fades out; and transmitting, over a computer network, the binaurally rendered sound track to an audio playback device for playback. In one aspect, producing the binaurally rendered sound track includes applying a HRTF to the sound track to produce the binaurally rendered sound track, applying reverb to the binaurally rendered sound track, and fading out the end portion of the binaurally rendered sound track. In some aspects, the faded out end portion is a first end portion, the binaurally rendered sound track includes a second end portion that begins at an end of the first end portion, wherein the method further includes trimming the second end portion off of the binaurally rendered sound track. In some aspects, the method further receives, over a computer network, a request from the audio playback device to stream the binaurally rendered sound track, where the track is transmitted in response to the request.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
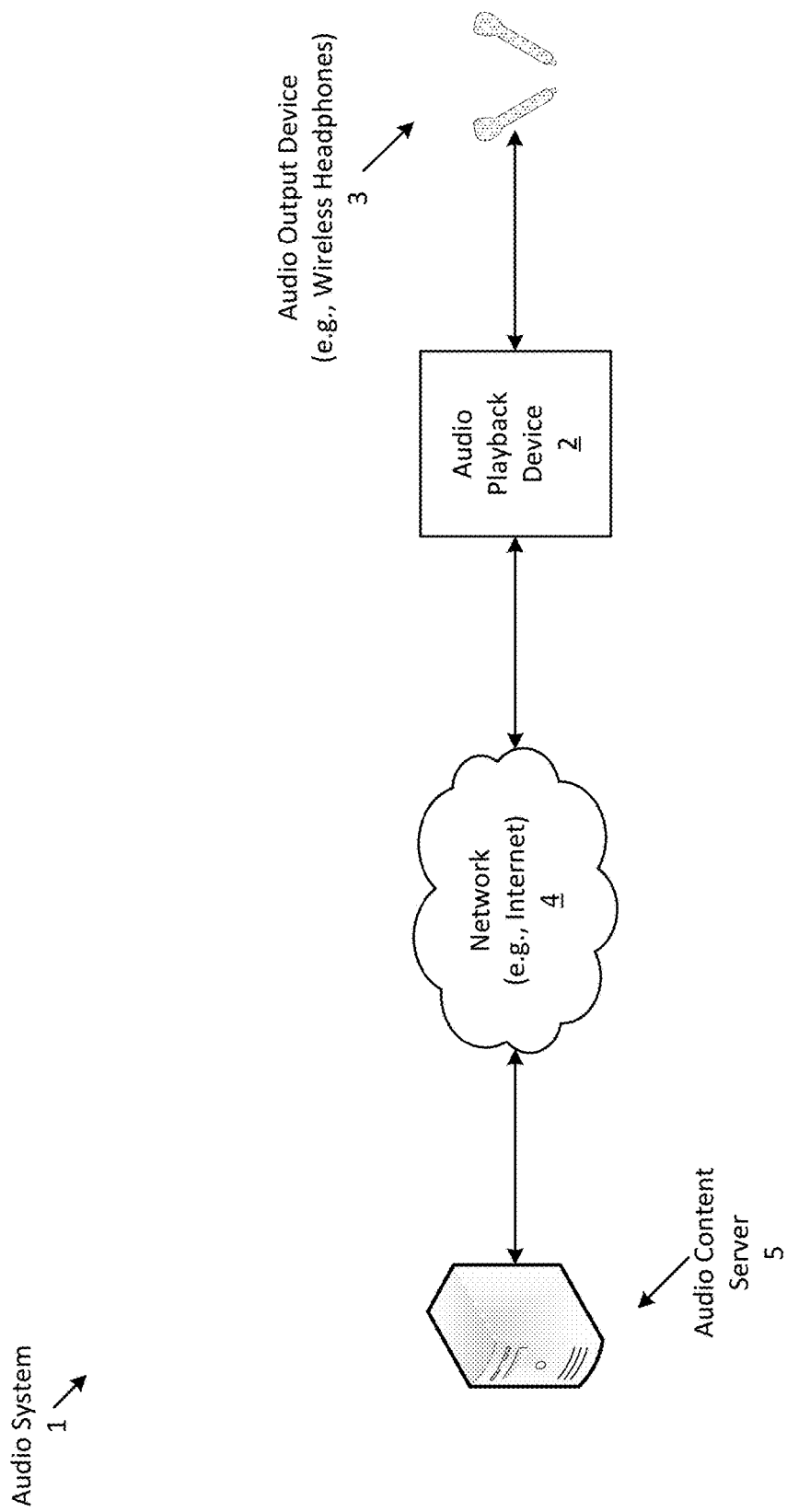
FIG. 1 shows a block diagram of an audio system that includes an audio content server for maintaining track length for pre-rendered spatial audio according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Some consumer devices are capable of creating three-dimensional (3D) sound effects (e.g., via headsets worn by listeners), giving the impression that there are virtual sound sources within a 3D space about a listener. To accomplish this, a device may retrieve (or stream) audio content, such as sound tracks of musical compositions (e.g., from an online music streaming platform), and spatially render audio content using spatial audio filters (e.g., head-related transfer functions (HRTFs)) that may be personalized for the listener into binaural audio signals. When these signals are used to drive speakers of a headset, sound produced by the speakers may be perceived to originate from a particular source (e.g., from behind the listener). Rendering audio content on listener devices has drawbacks. For example, to spatialize audio content, devices may require a significant amount of audio data and may require a considerable amount of processing power. Devices that do not have a sufficient amount of processing resources may be ill-equipped to effectively produce the 3D sound.

In which case, to provide a listener with 3D sound, another device (e.g., a remote server) that is communicatively coupled to the listener device may spatially render (or pre-render) the audio content. Pre-rendering audio content has some drawbacks. For example, to spatially render a sound track, the remote server may convolve the track with a head-related impulse response (HRIR) (which is the time-domain representation of a HRTF). The convolution of the sound track may result in a lengthening or stretching of the track (e.g., by several milliseconds) that may be caused by an added reverb tail of reverberation that is reflected by the HRTF. The track may also be lengthened due to other audio signal processing operations that are performed during the pre-rendering to provide a better listening experience. For example, reverb may be applied to the spatially rendered audio content (e.g., to provide more spaciousness and depth to the sound). The application of the reverb may extend the track (e.g., by several hundred milliseconds) that may also be the result of an added (or extended) reverb tail at the end of the track. Thus, the application of audio signal processing operations may extend the original track length (e.g., by adding additional sound, such as reverb tail at the end of the sound track).

To overcome these deficiencies, the present disclosure describes an audio system that is capable of maintaining track length of pre-rendered audio, such as sound tracks of a music album. Specifically, the system receives a sound track having a particular track length and produces a binaural audio version of the sound track. The system determines that the binaural audio version has an extended track length, which may be due to the reverb tail associated with the HRTF that was applied to the original sound track to produce the binaural audio version, as described herein. The system performs a fading operation upon the binaural audio version to gradually reduce a signal level of the binaural audio version to below a signal threshold level at a time along the extended track length that corresponds to an end time of the track length of the original sound track. The system then stores the binaural audio version having the track length of the original sound track in memory for later transmission to an audio playback device for driving one or more speakers. Thus, pre-rendered sound tracks may have the same track length as the original sound tracks.

FIG. 1 shows a block diagram of an audio system 1 that includes an audio content server 5 for maintaining track length for pre-rendered spatial audio according to one aspect. Specifically, the system includes an audio playback device 2, an audio output device 3, a (e.g., computer) network (e.g., the Internet) 4, and the audio content server 5. In one aspect, the system may include more or fewer elements, such as having additional audio content servers, or not including an audio playback device. In which case, the audio output device may stream the audio content for output, as described herein.

In some aspects, the audio content server 5 may be a stand-alone electronic server, a computer (e.g., desktop computer), or a cluster of server computers that are configured to pre-render audio content, as described herein. In one aspect, the audio content of the server may be any type of (e.g., user-desired) audio content, such as sound tracks of musical compositions, motion picture sound tracks, etc. In which case, the server may be a part of a cloud computer system that is capable of pre-rendering audio content and streaming the rendered audio content as a cloud-based service that is provided to one or more user devices (e.g., that are subscribed to the service). For example, the audio content server may be configured to stream audio content through an online media content (e.g., audio and/or video) streaming platform. Thus, the audio content may be in the form of sound tracks, where the sound tracks may be associated with other media content, such as being sound tracks of a motion picture. As shown, the server is communicatively coupled (e.g., via the network) to the audio playback device in order to stream pre-rendered audio content for playback (e.g., via the audio output device). More about the operations performed by the server is described herein.

In one aspect, the audio playback device may be any electronic device (e.g., with electronic components, such as a processor, memory, etc.) that is capable of streaming (e.g., pre-rendered) audio content, such as spatially rendered sound tracks (e.g., as one or more binaural audio signals), for playback (e.g., via one or more speakers integrated within the playback device and/or via one or more audio output devices, as described herein). For example, the playback device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch.

In one aspect, the audio output device 3 may be any electronic device that includes at least one speaker and is configured to output (or playback) sound by driving the speaker. For instance, as illustrated the device is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of audio content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the audio output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

In one aspect, the audio output device may be a wireless device that may be communicatively coupled to the audio playback device in order to exchange audio data. For instance, the playback device may be configured to establish the wireless connection with the audio output device via a wireless communication protocol (e.g., BLUETOOTH protocol or any other wireless communication protocol). During the established wireless connection, the playback device may exchange (e.g., transmit and receive) data packets (e.g., Internet Protocol (IP) packets) with the audio output device, which may include audio digital data in any audio format.

In another aspect, the audio playback device 2 may communicatively couple with the audio output device 3 via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio playback device. Once connected, the playback device may be configured to drive one or more speakers of the audio output device with one or more audio signals, via the wired connection. For instance, the playback device may transmit the audio signals as digital audio (e.g., PCM digital audio). In another aspect, the audio may be transmitted in analog format.

In some aspects, the audio playback device 2 and the audio output device 3 may be distinct (separate) electronic devices, as shown herein. In another aspect, the playback device may be a part of (or integrated with) the audio output device. For example, at least some of the components of the playback device (such as one or more processors, memory, etc.) may be part of the audio output device, and/or at least some of the components of the audio output device may be part of the playback device. In which case, at least some of the operations performed by the audio playback device (e.g., streaming audio content from the audio content server 5) may be performed by the audio output device.

Figure 2:
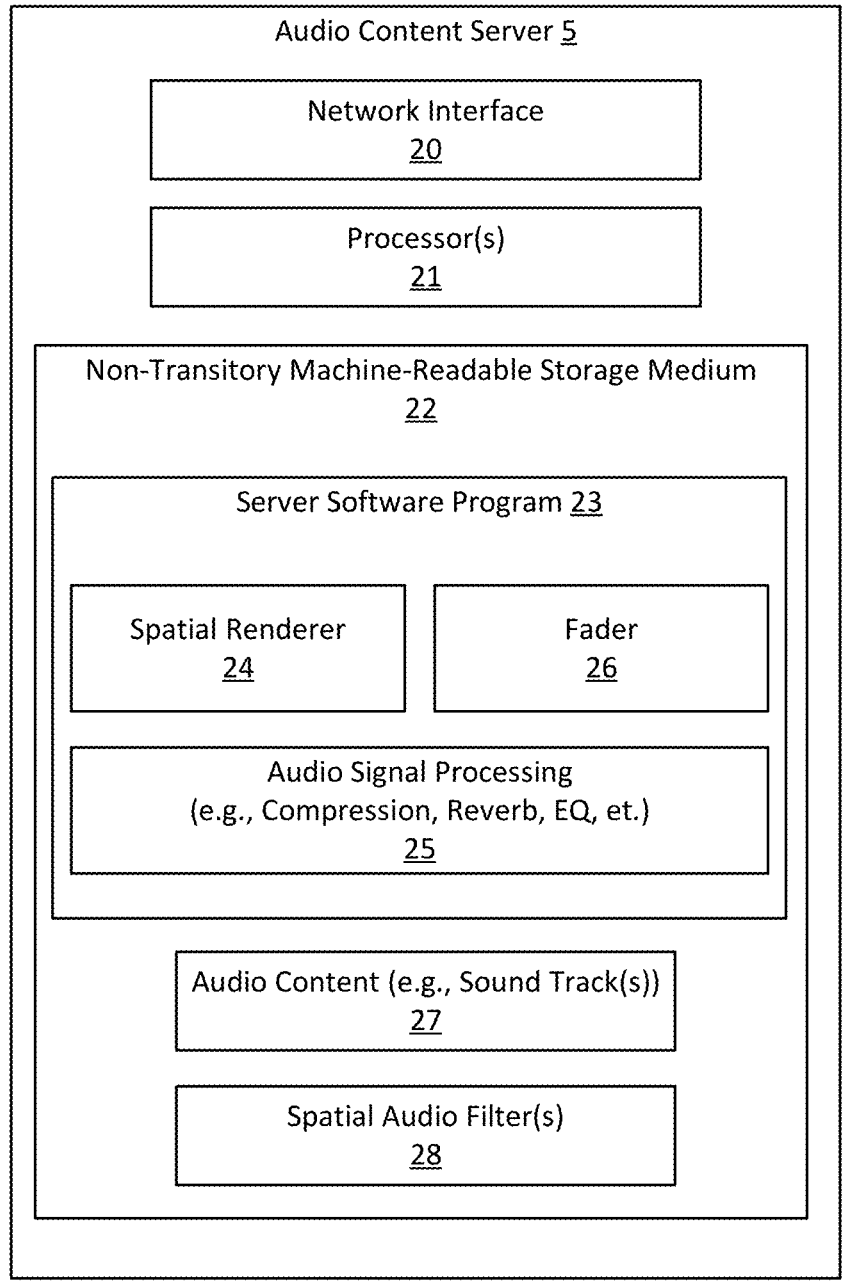
FIG. 2 shows an example of the audio content server according to one aspect.

FIG. 2 shows an example of the audio content server 5 according to one aspect. In one aspect, the audio content server may be operated by one or more audio content providers (e.g., via an online streaming platform), and is capable of providing (e.g., streaming) audio content to one or more audio playback devices, such as device 2. For example, the server may receive a request (e.g., via network 4) from a device (e.g., audio playback device 2) to stream a piece of audio content, such as a sound track (e.g., of a musical composition). The server may encode the audio content using any audio codec (e.g., MP3, AAC, etc.), and may transmit the encoded audio content to the audio playback device to be decoded and output (e.g., by driving one or more speakers with one or more driver signals that include the audio content). In addition, the server may be configured to pre-render audio content for later transmission to one or more audio playback devices. More about pre-rendering audio content is described herein.

The server includes a network interface 20, one or more processors 21, and a non-transitory machine-readable storage medium 22 (or memory). The network interface 20 provides an interface for the server 5 to communicate with the audio playback device 2 in order to stream audio content. For example, the network interface is configured to establish a communication link with the audio playback device (e.g., in response to receiving a request to stream audio content, as described herein), and once established transmits the audio content, as described herein. Examples of non-transitory machine-readable storage medium may include read-only memory, random-access memory, CD-ROMS, DVDs, magnetic tape, optical data storage devices, flash memory devices, and phase change memory. Although illustrated as being contained within the server, one or more of the components may be a part of separate electronic devices, such as the medium 22 being a separate data storage device. For example, the storage medium may be a part of (or contain) an online database with which the server is communicatively coupled. As shown, the non-transitory machine-readable storage medium has stored therein a server software program 23, audio content 27, and one or more spatial audio filters 28.

As described herein, the audio content 27 may include sound tracks (e.g., pieces of audio content), each being a musical composition of one or more (e.g., music) albums. In another aspect, sound tracks may include any type of audio content, such as podcasts, sound tracks of motion pictures, etc. In one aspect, the audio content 27 may include one or more (e.g., different) versions of a same sound track. For example, the audio content 27 may include different audio formats of a sound track. For instance, the audio content 27 may include a mono version (e.g., as one channel) or a stereo version (e.g., as two stereophonic channels) of a sound track. In one aspect, the audio content may include a multi-channel version in any surround sound multi-channel format (e.g., 5.1, 7.1, etc.). As another example, the audio content may include a sound space representation of a virtual sound source, such as Higher Order Ambisonics (HOA) representation of a sound space that includes audio content (e.g., positioned at a virtual position within the space), a Vector-Based Amplitude Panning (VBAP) representation of the sound, etc. In another example, the audio content may include an object-based representation of a sound that includes one or more audio channels that has (at least a portion of) a sound and metadata that describes the sound (e.g., spatial characteristics of the sound). In some aspects, the audio content may include other audio formats. In another aspect, the audio content 27 may include one or more of the same version of a sound track. For example, the audio content server may include several stereo versions of a same sound track, each of which may be processed differently. As an example, the audio content server may include a stereo version of a sound track to which reverb has been added, and include another stereo version that does not include the applied reverb. As described herein, the audio content 27 may also include a spatial rendered version (e.g., a binaural audio version) of one or more sound tracks.

The spatial audio filter(s) 28 include one or more spatial filters for performing spatial rendering, as described herein. In one aspect, the spatial filters may include one or more HRTFs, equivalently, one or more HRIRs. In some aspects, the spatial filters may be predefined (or default) filters (e.g., defined in a controlled setting, such as a laboratory), and may therefore not be personalized for any particular user of an audio playback device to which the audio content server streams audio content, as described herein. In another aspect, at least some of the spatial filters may be personalized for a user of an audio playback device (e.g., playback device 2 of audio system 1) to account for the user's anthropometrics.

The server software program 23, which when executed by the one or more processors 21 of the content server performs audio signal processing operations to maintain track length for pre-rendered spatial audio, includes one or more operational blocks, such as a spatial renderer 24, audio signal processing 25, and a fader 26. In one aspect, the server software program may include more or fewer operational blocks. In another aspect, at least some of the operations described herein may be performed by one or more other electronic devices that are communicatively coupled with the audio content server. For example, the audio playback device 2 may be configured to perform one or more audio signal processing operations upon audio content.

The spatial renderer 24 is configured to receive a sound track (e.g., retrieving the sound track from the audio content 27), and is configured to spatially render the sound track. In particular, the renderer may apply one or more spatial filters 28 to (e.g., one or more channels that make up) the sound track to produce a spatially rendered (or processed) sound track. For example, the renderer may apply one or more HRTFs upon the sound track to produce a binaural audio version of the sound track (e.g., as at least one binaural signal). In one aspect, the spatial renderer may produce several spatial renderings of a sound track based on a type of audio output device that is to output the track. For example, the renderer may spatially render a stereophonic recoding using one or more HRTFs, to produce binaural audio signals for a head-mounted audio output device (e.g., headphones), as described herein. As another example, when the audio output device includes one or more loudspeakers, the spatial renderer may render a HOA representation of a sound track to produce one or more loudspeaker driver signals (e.g., based on a predefined loudspeaker configuration).

The audio signal processing 25 may perform one or more audio signal processing operations upon one or more sound tracks. Specifically, the server software program may perform the operations before and/or after a sound track has been spatially rendered by the renderer 24. In one aspect, the processing 25 may be configured to perform (dynamic) compression operations upon a sound track. In one aspect, the compression may be based on the spatial rendering of the sound track. For example, prior to spatially rendering the sound track, the sound track may have a dynamic range that does not exceed a signal threshold level. For instance, the sound track may be a digital audio signal that does not exceed a digital domain range from a positive threshold value (e.g., "+1") to a negative threshold value ("−1"). In one aspect, the (e.g., positive) signal threshold value may represent the maximum signal level, such as 0 decibels relative to full scale (dBFS) of the audio system (or more specifically the audio output device), above which portions of the digital signal may be clipped if used to drive one or more speaker drivers. When a sound track is spatially rendered, the resulting digital signal may exceed the digital range (e.g., crossing +1 and/or −1). This may be due to the types of digital audio signal processing that is performed by the audio signal processor 25. For instance, the server software program may be configured to perform floating-point digital audio signal processing in which audio data is in a floating-point audio format that has a high dynamic range (e.g., a 32-bit audio sample has a dynamic range of more than 1,500 dB). As a result, the dynamic range of a digital audio signal in floating-point audio format may exceed the digital domain range. Thus, the audio signal processor may be configured to determine whether a portion of the sound track has a signal level that exceeds the signal threshold level of the digital domain. If so, dynamic range compression may be applied upon the portion to produce a compressed audio signal with a digital waveform that remains within the digital range (e.g., not exceeding the signal threshold level). In one aspect, the applied dynamic range compression may be based on a difference between the signal level of the portion and the signal threshold level.

In another aspect, the audio signal processing 25 may perform other operations, such as adding (or applying) reverberation (or reverb) to the (e.g., rendered) sound track. For instance, the audio signal processing may apply convolution reverb to at least a portion of the spatially rendered sound track. In another aspect, the processing may apply a reverb audio filter, where the processing may adjust a gain of the filter in order to apply (or add) a certain amount of reverb to the track. As another example, the processing 25 may apply equalization operations and spectral shaping operations. For instance, one or more (e.g., linear) filters, such as low-pass filters, band-pass filters, high-pass filters, etc.) may be applied to (at least a portion of) the track. In another aspect, a scalar gain value may be applied to the sound track (e.g., to reduce the signal level of the track). In some aspects, any signal processing operation may be performed upon the sound track.

As described herein, the application of spatial filters upon a sound track may extend the track's length. Thus, the spatially rendered sound track may have an extended track length with respect to the track length of the (original or pre-rendered) sound track. For instance, this may be caused by a reverb tail of reverberation that is reflected by the applied spatial filter. In another aspect, the length of the sound track may be extended based on the one or more audio signal processing operations performed by the e.g., audio signal processing 25 of the) server software program 23. For example, the application of reverberation (or more specifically the late reflections of the reverberation) upon the sound track may extend the length of the sound track. Thus, the extended track length of a spatially rendered sound track upon which reverberation has been applied may be at least partially based on 1) the spatial filter that is applied upon the sound track and/or 2) the applied reverb. In one aspect, the sound track may be extended by stretching the track to a new extended track length, as described herein. In another aspect, the sound track may be extended by having an additional portion (e.g., a reverb tail) added to an end portion of the original track length (e.g., added at an end or stop time of the original track).

The fader 26 is configured to perform a fading operations upon the spatially rendered (and/or audio processed) sound track in order to maintain the track length of the "original" sound track (e.g., the sound track prior to being spatially rendered and/or audio processed). Specifically, the fading operations may be performed such that the spatially rendered sound track has the same track length as (or approximately the same track length, such as being within a threshold of) the original sound track (or rather the version of the sound track from before it was spatially rendered). In one aspect, the fading operation may be a "fading-out" of the sound track, such that a signal level of the spatially rendered sound track is gradually reduced to below a signal threshold level (e.g., −90 dBFS) at a time along the spatially rendered extended track length that corresponds to an end time of the track length of the original sound track. In one aspect, the fader may begin to fade out the spatially rendered sound track at a predefined time prior to the end time of the original sound track. In another aspect, the fading operation may begin at a time based on a difference between the track length of the original sound track and the extended track length of the spatial rendered sound track. In which case, the fader may be configured to determine that the spatially rendered sound track has an extended track length. For example, the fader may compare the track length of the processed track with the track length of the original sound track to determine the difference.

In one aspect, the fader may be configured to trim the track length of the processed sound track. Specifically, upon performing the fading operation, the spatially rendered track may still include an end portion that extends beyond the original track's length. In which case, the fader may trim the extra end portion of the processed sound track that begins at the time along the track's extended track length that corresponds to the end time of the track length of the original track, so that processed sound track has the same track length as the original track. More about trimming the extra portion is described herein.

In some aspects, the fader may trim the extra end portion of the processed sound track without performing a fading operation. Specifically, the fader may determine whether an end portion of the processed sound track (naturally) fades to silence before or at a time that the original sound track ends. For instance, the fader may determine whether a signal level of the end portion of the spatial rendered sound track that exceeds beyond the track length of the original sound track is below a signal threshold level (e.g. −90 dBFS). If so, the fader trims the end portion off of the spatial rendered track. In one aspect, the determination of whether to trim the end portion without performing the fading operation may be based on whether the entirety of the end portion (of the rendered track that exceeds the original track) remains below the signal threshold level along the length of the end portion. If not, however, meaning that at least some of the end portion is above the signal threshold level, the fader may perform the fading operation.

In another aspect, the fader may perform a fading operation with respect to a performed audio signal processing operation upon the sound track. Specifically, the fader may fade out one or more audio signal processing operations (e.g., in addition to or in lieu of fading the signal level of the rendered track) in order to prevent the performed operation from extending the length of the sound track. For example, when applying a convolution reverb upon the sound track, the track's length may be extended. In response, the fader may fade out the reverb (e.g., by gradually reducing the amount of reverb that is applied to the sound track), in order to prevent or reduce the reverb tail of the reverb from extending the sound track beyond the track's original length. In one aspect, the fader may fade out the processing operation at an end portion of the processed sound track. In another aspect, the fader may fade out the audio processing operation and the signal level of the sound track. More about fading out one or more audio signal processing operations is described herein.

In some aspects, when applying both spatial filters (e.g., HRTF filters) and reverb, the fader may fade the reverb (e.g., at an end portion of the sound track), but may not fade out the spatial filtering. In one aspect, this may provide the minimum audible impact. In one aspect, the rendered sound track may still have an extended length based on the natural reverb of the HRTF. As a result, the renderer may just truncate the end portion of the rendered sound track that extends beyond its original length.

In another aspect, the fader may cross-fade from spatial (e.g., binaural) to non-spatial (e.g., non-binaural) audio, close to an end portion of a sound track in order get rid of (or reduce) filtering (e.g., and therefore lengthening) of the rendered track. Thus, the rendered sound track would be spatially rendered up to an end portion of the track, at which point the spatial characteristics of the rendered sound track would be reduced. For example, at a particular period of time along the track length, the fader may begin to cross fade the non-spatial audio into the spatial audio, and may increase the amount of non-spatial audio that is added into the spatial rendering as the sound track increases (e.g., moves along from the particular period of time). In one aspect, at the end of the spatially rendered sound track, the non-spatially rendered audio content may be (e.g., completely) faded into the track in lieu of the spatially rendered content. As a result of reducing the spatial aspects, the rendered track would have a same (or substantially the same) track length as the original sound track. In one aspect, performing cross-fading does not reduce a signal level (e.g., of an end portion) of the rendered sound track.

FIGS. 3-5 and 9 are flowcharts that include processes 30, 40, 80, and 90, respectively that may be performed by the (e.g., server software program 23 while being executed by the) processor 21 of the audio content server 5. Specifically, at least some of the operations may be performed by at least some of the operational blocks 24-26 performed by the server software program, as described herein.

Figure 3:
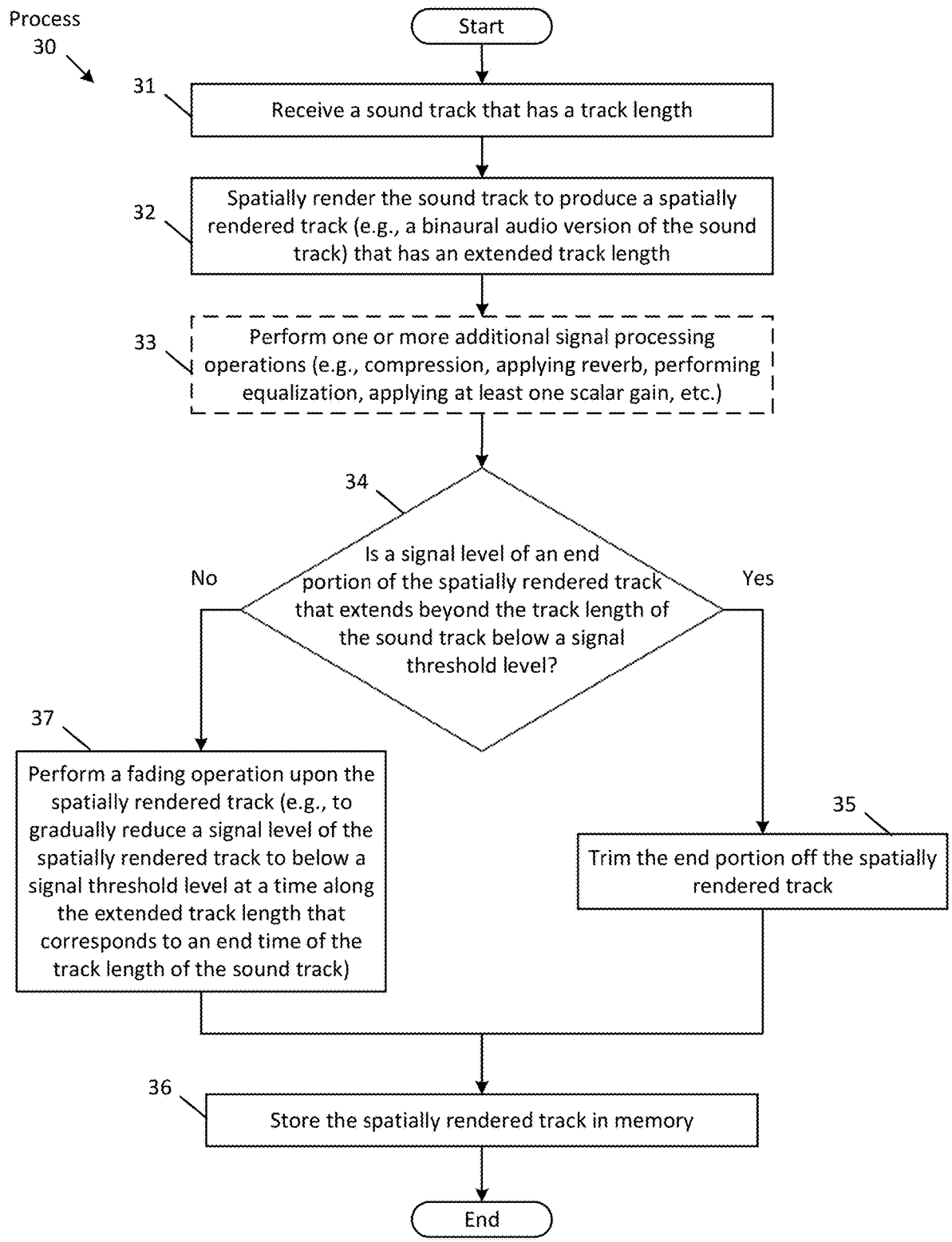
FIG. 3 is a flowchart of one aspect of a process for maintaining track length of a spatially rendered sound track according to one aspect.

Regarding FIG. 3, this figure is a flowchart of a process 30 for maintaining track length of a (e.g., individually) spatially rendered sound track, according to one aspect. The process 30 begins by the server software program receiving a sound track, where the sound track has a track length (at block 31). For instance, the sound track may be received from the audio content 27 that is stored within the memory of the audio content server (or from a remote memory device, as described herein). The software program spatially renders the sound track to produce a spatially rendered sound track (e.g., a binaural audio version of the sound track) that has an extended track length (at block 32). In particular, the software program applies a (e.g., predefined) spatial filter (e.g., at least one HRTF) upon the sound track to produce the rendered track (e.g., that may include one or more binaural audio signals). The software program performs one or more signal processing operations, such as dynamic range compression, applying reverb, performing equalization operations, and/or applying at least one scalar gain, etc., as described herein (at block 33). In one aspect, the performance of the signal processing operations may be optional (as illustrated by block 33 having a dashed border). The software program determines whether a signal level of an end portion of the rendered track that exceeds the track length of the (original) sound track is below a signal threshold level (at decision block 34). In particular, the software program determines whether the end portion of the spatially rendered track that begins at a time that corresponds to an end time of the original sound track (e.g., the end portion of the rendered track exceeding the track length of the original track) is below the threshold. If so, the software program trims the end portion off of the rendered track, such that the rendered track has the same track length of the original sound track (at block 35). The software program then stores the rendered track in memory (at block 36). In particular, the software program stores the spatial rendered track in the audio content 27 of the server 5.

If, however, the end portion does not have a signal level that is below the signal threshold level, the software program performs a fading operation upon the spatially rendered track (at block 37). In particular, the software program applies the fading operation to gradually reduce a signal level of the spatially rendered track to below a signal threshold level at a time along the extended track length of the spatially rendered track that corresponds to an end time of the track length of the sound track. Thus, the program fades out (e.g., to −90 dB) the rendered track at a time along its extended track length that corresponds to the end time of the original track. In one aspect, upon performing the fading operation, the software program may trim off the end portion of the spatial rendered track, such that both tracks have the same track length.

In one aspect, the fading operation may reduce the (e.g., overall) signal level of the spatially rendered track. In another aspect, the fading operation may be applied to the spatial filer, while the audio content is being spatially rendered. For example, the software program may fade (e.g., reduce) the HRIR that is being convolved with the audio signal in order to fade the spatialization of the sound track (e.g., with respect to time). In particular, the reduction of the spatialization of the sound track may increase from a period of time (e.g., at the end of the sound track).

Figure 4:
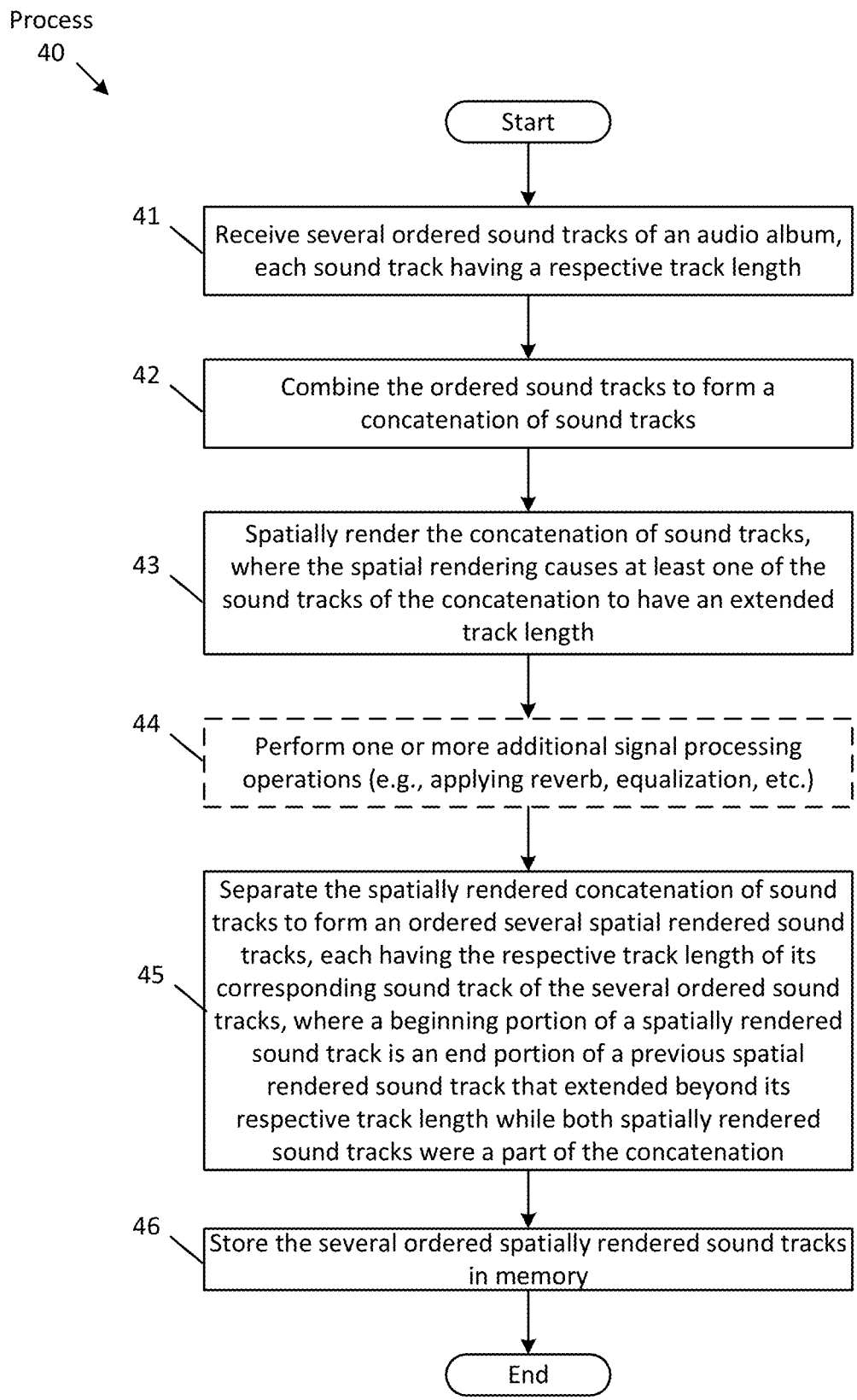
FIG. 4 is a flowchart of one aspect of a process for spatially rendering a concatenation of several sound tracks according to one aspect.

FIG. 4 is a flowchart of one aspect of a process 40 for spatially rendering a concatenation of several sound tracks according to one aspect. Specifically, this process describes spatially rendering an entire (or at least a portion of an) audio (or music) album that includes a concatenation of several sound tracks, and maintaining respective track lengths of each of the sound tracks. The process 40 begins by the server software program 23 receiving several ordered sound tracks of an audio (or music) album, each sound track having a respective track length (at block 41). For instance, the software program may retrieve an entire (or at least a portion of an) audio album from the audio content 27. The software program combines the ordered sound tracks to form a concatenation of sound tracks (at block 42). Specifically, the sound tracks are added together in the order they appear within their audio album to create one sound track (e.g., digital audio signal) (e.g., where track one being at a front end of the concatenation and the last track being at a back end of the concatenation). The software program spatially renders (e.g., by applying one or more spatial filters, as described herein, to) the concatenation of sound tracks, where the rendering causes at least one of the sound tracks of the concatenation to have an extended track length (at block 43). For instance, the concatenation may stretch (e.g., linearly), such that each track within the concatenation expands at least a portion of the total expansion of the concatenation. The software program (optionally) performs one or more audio signal processing operations, such as dynamic range compression, applying reverb, and/or equalization (at block 44).

The software program 23 separates the spatially rendered concatenation of sound tracks to form ordered spatially rendered sound tracks (e.g., where the order of sound tracks are in the same order as the original sound tracks), each of the spatial rendered sound tracks having the respective track length of its corresponding sound track of the ordered original sound tracks (at block 45). Specifically, the software program separates the sound tracks based on their order (and track length) of the concatenation prior to the spatial rendering (and/or the audio signal processing operations). For instance, starting at the first sound track in the concatenation, the program cuts along the length of the spatial rendered concatenation at a time that corresponds to an end time of the original first sound track. Since, however, the sound tracks of the concatenation have been spatial rendered, each (or at least some) of the tracks have an extended track length. Thus, once cut, a beginning portion of a second spatially rendered sound track (e.g., being the second track in the album and after the first track) is an end portion of a previous spatial rendered sound track (e.g., the first track in the album) that extended beyond its respective track length while both spatial rendered sound tracks were a part of the concatenation. In one aspect, each successive spatially rendered sound track will (or may) begin with an end of an adjacent previous spatial rendered sound track. For instance, the next cut, to separate the second rendered sound track may be at a time along the length of the concatenation that corresponds to a combined track length of both the first and second original sound tracks. As a result, a third (potential) rendered sound track would begin with the end portion of the second. The software program stores the several ordered spatial rendered sound tracks in memory (at block 46).

In one aspect, the software program may perform similar operations as described in process 30 of FIG. 3, with respect to the last spatially rendered sound track in the concatenation in order for the sound track to maintain its original track length. For example, the fader 26 may fade out the last rendered sound track at a time along its respective extended track length that corresponds to an end time of a corresponding sound track of the ordered sound tracks. In another aspect, the fader may determine at what time to fade out the last rendered sound track based on the track length of the concatenation. For example, once the concatenation is rendered, the fader may fade out the end portion of the concatenation (which is the end portion of the last rendered sound track), such that the spatial rendered concatenation has the same length as the concatenation of the original sound tracks. In some aspects, the end portion of the concatenation may be trimmed, as described herein.

In one aspect, the concatenation of ordered sound tracks that are spatially rendered may not each be a part of a particular audio album. In particular, the sound tracks may be a part of a collection of sound tracks that are organized (e.g., by the server 5) in a particular order. For instance, the order may be based on listener preferences or settings.

As described thus far, the sever software program 23 may individually render sound tracks or render a concatenation of sound tracks (e.g., which are of the same album), and maintain track lengths of the rendered sound tracks in order to transmit the (pre-)rendered sound tracks to one or more audio playback devices. In one aspect, the server software program 23 may transmit either individually rendered sound tracks or rendered sound tracks separated from a rendered concatenation based on how a listener is playback (or requesting to playback) the sound tracks. For example, if the listener is to listen to one rendered sound track, the server may transmit the sound track that was rendered individually (as described in FIG. 3), rather than a sound track that was rendered as a part of a concatenation of sound tracks (as described in FIG. 4). For instance, since the length of the concatenation is stretched when rendered, the track length of each of the spatial rendered sound tracks within the concatenation may extend beyond its original length. As a result, when separating the spatially rendered sound tracks at their original length to be transmitted to a listener device, each successive sound track will begin with an end portion of a previous sound track of the album that had extended beyond its original length within the concatenation. Although tracks that begin with the ending of a previous track may be unnoticeable to a listener who is listening to the tracks in the order that they appear in their music album, an issue may occur when a listener is to listen to the tracks out of order or individually. In which case, the listener may hear and perceive the last moment of the previous sound at the beginning of a sound track as an undesirable audio artifact or glitch (e.g., when listening to a second rendered sound track of an album without listening to the first rendered sound track).

Figure 5:
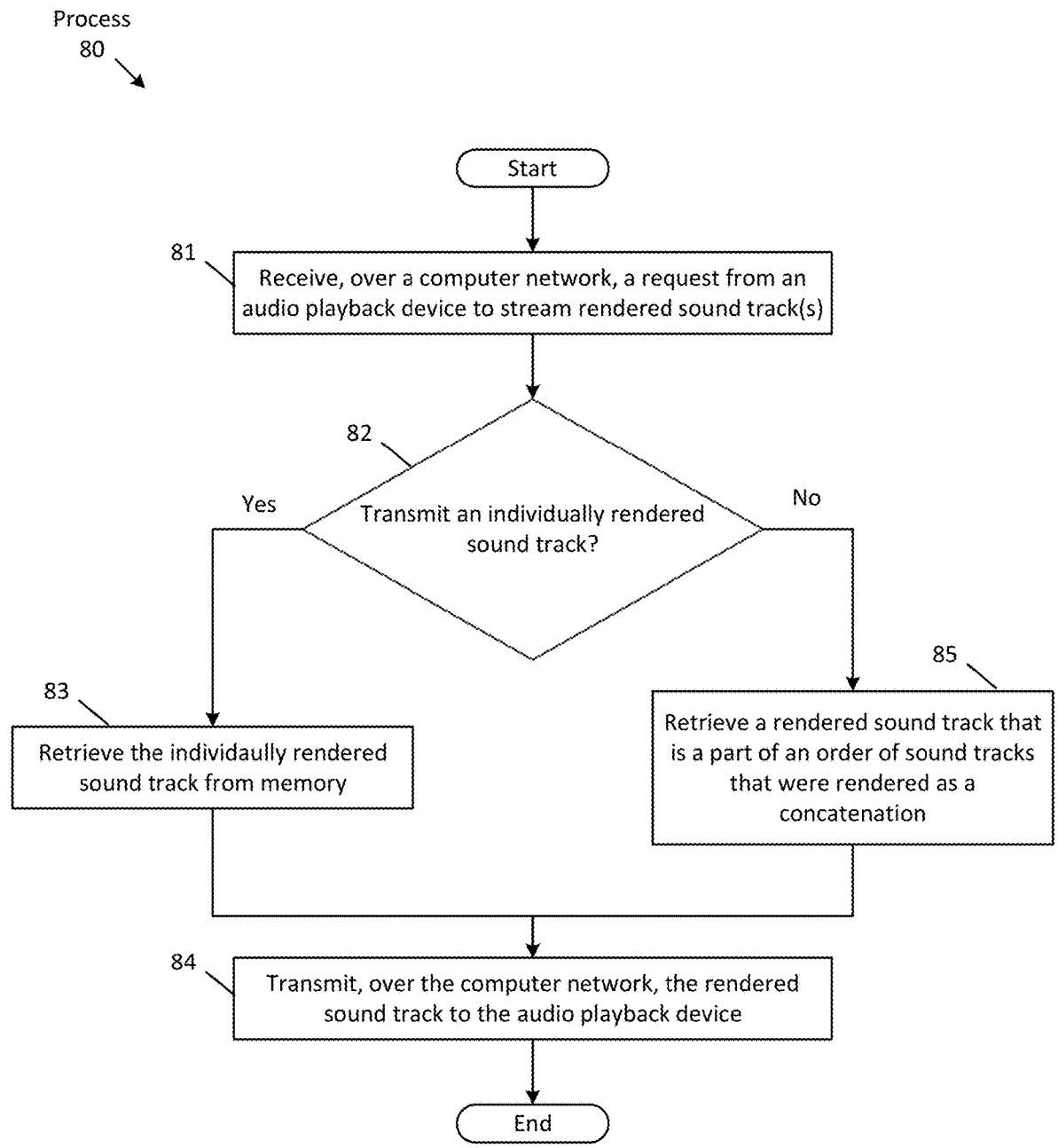
FIG. 5 is a flowchart of one aspect of a process for transmitting rendered sound tracks to an audio playback device according to one aspect.

FIG. 5 is a flowchart of one aspect of a process 80 for transmitting rendered sound tracks to an audio playback device according to one aspect. The process 80 begins by the server software program 23 receiving, over a computer network (e.g., network 4) a request from an audio playback device to stream rendered sound track(s) (at block 81). For instance, the audio playback device may include an audio playback application (e.g., a music streaming application) that is being executed by the (e.g., one or more processors of the) audio playback device. Through the application (e.g., a graphical user interface (GUI) of the application displayed on a display screen of the audio playback device, the user of the device may select a particular sound track for playback. Once selected, the application may transmit the request to the server.

The server determines whether to transmit an individually rendered sound track, where the rendered sound track maintains the same track length as a corresponding original sound track (at decision block 82). Specifically, the server may make this determination based on the request received from the audio playback device. For example, the request may indicate that the user of the audio playback device is requesting to stream a particular audio album. In another aspect, (e.g., metadata within) the request may indicate that the user is requesting to listen to an order of sound tracks (e.g., via a user setting on the audio playback device). If so, the software program 23 retrieves the individually rendered sound track from memory (e.g., audio content 27) (at block 83). The software program then transmits, over the computer network, the rendered sound track to the audio playback device (at block 84). Otherwise, if the software program determines that the user is requesting to listen to an order of sound tracks, which have bene pre-rendered, the software program retrieves a rendered sound track that is part of an order of sound tracks (e.g., an audio album) that were rendered as a concatenation (at block 85), and transmits the rendered sound track(s) (e.g. in consecutive order). Thus, the audio content server transmits pre-rendered sound tracks that have a same track length as the original sound track to a (or at least one) playback device.

Some aspects may perform variations to the processes 30, 40, and 80. For example, the specific operations may not be performed in the exact order shown and described. The specific operations may not be performed in one continuous series of operations and different specific operations may be performed in different aspects.

Figure 6:
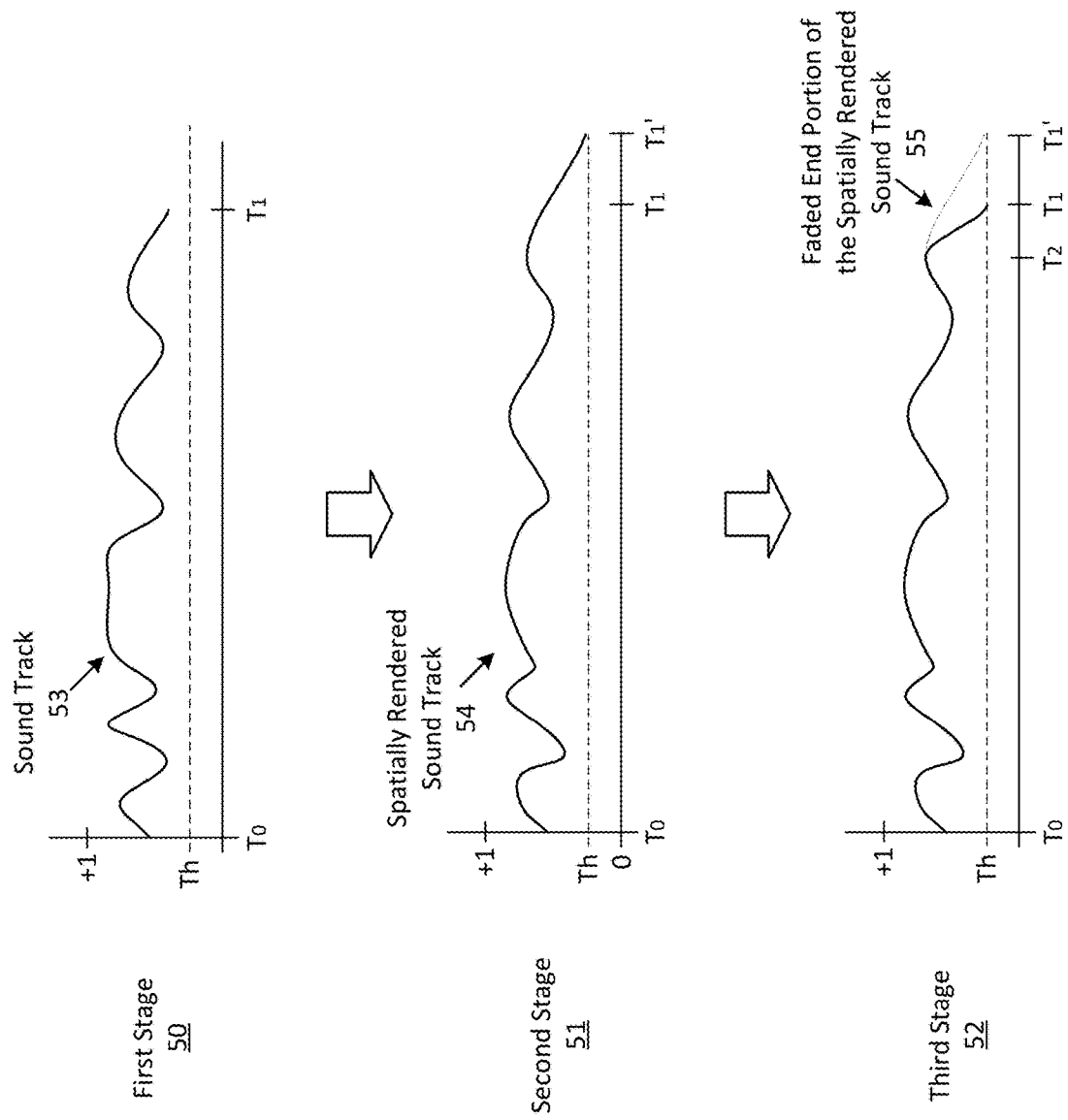
FIG. 6 illustrates several stages for applying a fading operation upon a spatially rendered sound track to maintain track length according to one aspect.

FIG. 6 illustrates three stages 50-52 in which the audio content server 5 applies a fading operation upon a spatial rendered sound track to maintain track length (e.g., as described in process 30 of FIG. 3) according to one aspect. The first stage 50 shows a digital waveform of a (e.g., original) sound track 53. Specifically, this stage shows the (e.g., positive portion of the digital waveform of the) sound track along a track length from $T_0$ to $T_1$. The second stage 51 shows the digital waveform of the spatially rendered sound track 54. In one aspect, track 54 may be the result of the application of one or more HRTFs upon the sound track 53. As a result, the rendered sound track 54 has an extended track length with respect to the original sound track's length. In particular, the rendered track has an end portion (e.g., $T_1$-$T_1'$) that extends beyond the original tracks end time, $T_1$. Thus, the rendered track has an extended track length, $T_0$-$T_1'$.

Also shown, the end portion of the rendered sound track drops to a signal threshold level ("Th"). In particular, a signal level of the end portion of the rendered sound track attenuates to Th. In one aspect, the signal threshold level may correspond to −90 dBFS. In another aspect, the threshold level may be another sound pressure value. In one aspect, the drop of the signal level may correspond to the reverb tail reflected by the spatial filter applied to the sound track, which causes the end portion of the sound track to decay to the −90 dB (or silence). In another aspect, the end portion of the spatially rendered sound track may not decay to or below Th. The third stage 52 shows the spatially rendered sound track 54 that includes a faded end portion 55, which fades to Th at $T_1$. For instance, the fader 26 of the server software program 23 performs a fading operation in which the rendered sound track begins to fade at $T_2$ and fades out the sound track, such that a signal level of the sound track reaches (or goes below) Th by $T_1$. For example, the software program may fade the spatial rendering (e.g., reducing the applied spatial filter) upon the sound track (e.g., at or before $T_2$), in order to reduce the track length. In another aspect, the software program may fade the signal level of the overall audio signal in order to reduce the level to be equal to or below Th at $T_1$.

Figure 7:
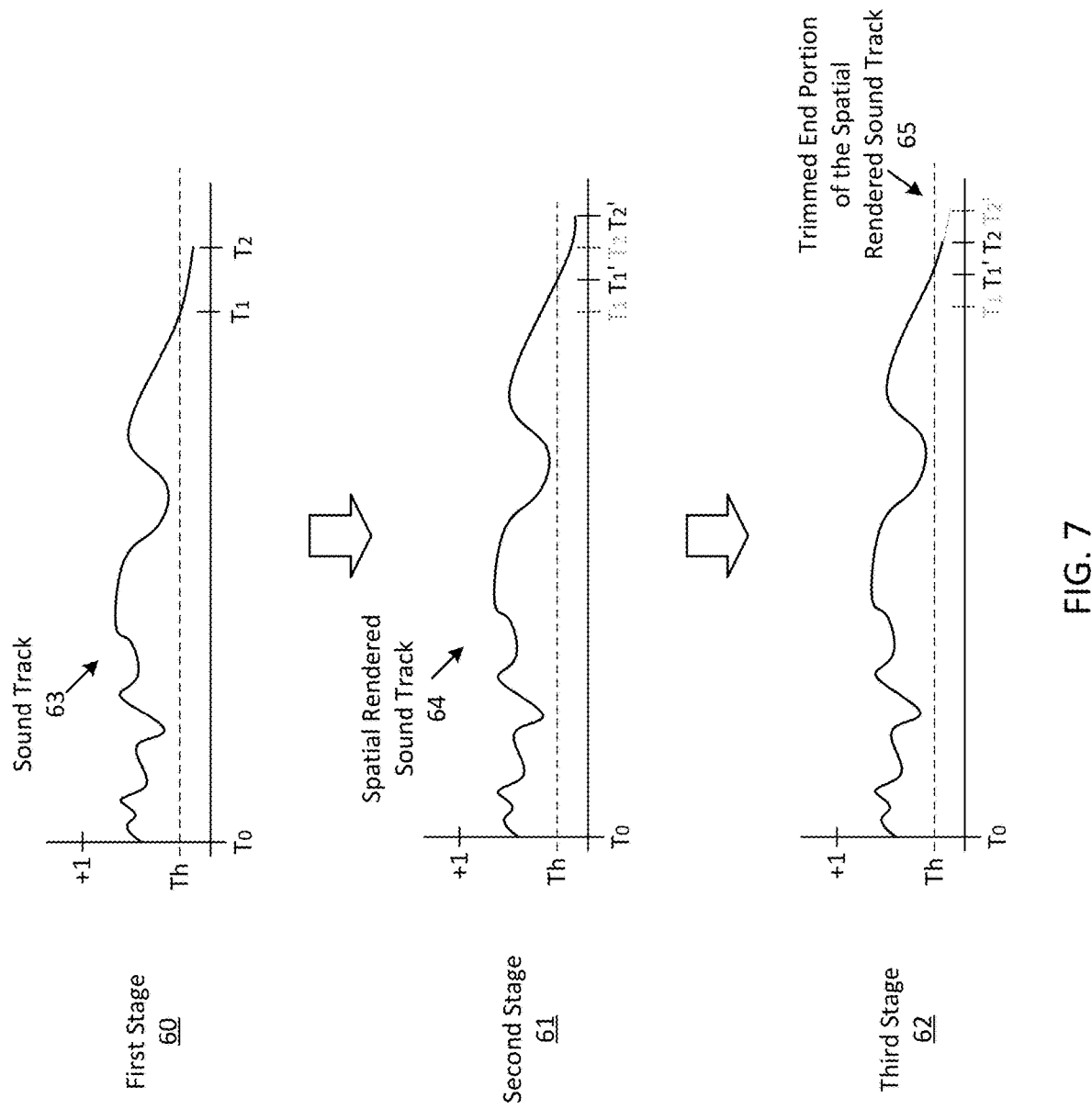
FIG. 7 illustrates several stages for trimming an end portion of a spatially rendered sound track to maintain track length according to another aspect.

FIG. 7 illustrates three stages 60-62 in which the audio content server 5 trims an end portion of a spatial rendered sound track to maintain track length (e.g., as described in process 30 of FIG. 3) according to another aspect. The first stage 60 shows a digital waveform of a sound track 63 that has a track length of $T_0$-$T_2$, and includes an end portion that dips below the Th. Specifically, this stage shows that a signal level of the sound track 63 drops below Th at $T_1$, and remains below Th up to $T_2$. In one aspect, this end portion may represent silence at the end of the sound track. The second stage 61 shows the digital waveform of the spatial rendered sound track 64 (e.g., which is the result of applying one or more spatial filters, as describe herein). As a result, the rendered sound track 64 has an extended track length that extends beyond the end time, $T_2$, of the original sound track 63. Specifically, as a result of the spatial rendering, the signal level of the sound track drops below Th at $T_1'$, and remains below Th until −$T_2'$, which is the end time of the rendered track.

The third stage 62 shows that an end portion of the spatial rendered sound track 65 has been trimmed off of the rendered sound track. In particular, the server software program may determine that this end portion may be trimmed based on whether the end portion drops below the signal threshold level before the end of the original sound track. For instance, the software program may determine to trim the end portion based on whether the signal level of the rendered sound track drops below Th before $T_2$. In other words, the software program determines whether the rendered sound track naturally fades to silence before (or at) $T_2$. In this case, since $T_1'$ (e.g., the time at which the signal level drops below Th) is before $T_2$, the software program has trimmed the portion of the rendered track between $T_2$-$T_2'$. As described herein, the end portion may be trimmed if the end portion after $T_2'$ remains below Th up to $T_2$. If, however, the signal level was to increase above Th between $T_2'$ and $T_2$, the software program may perform the fading operations, as illustrated in FIG. 6.

Figure 8:
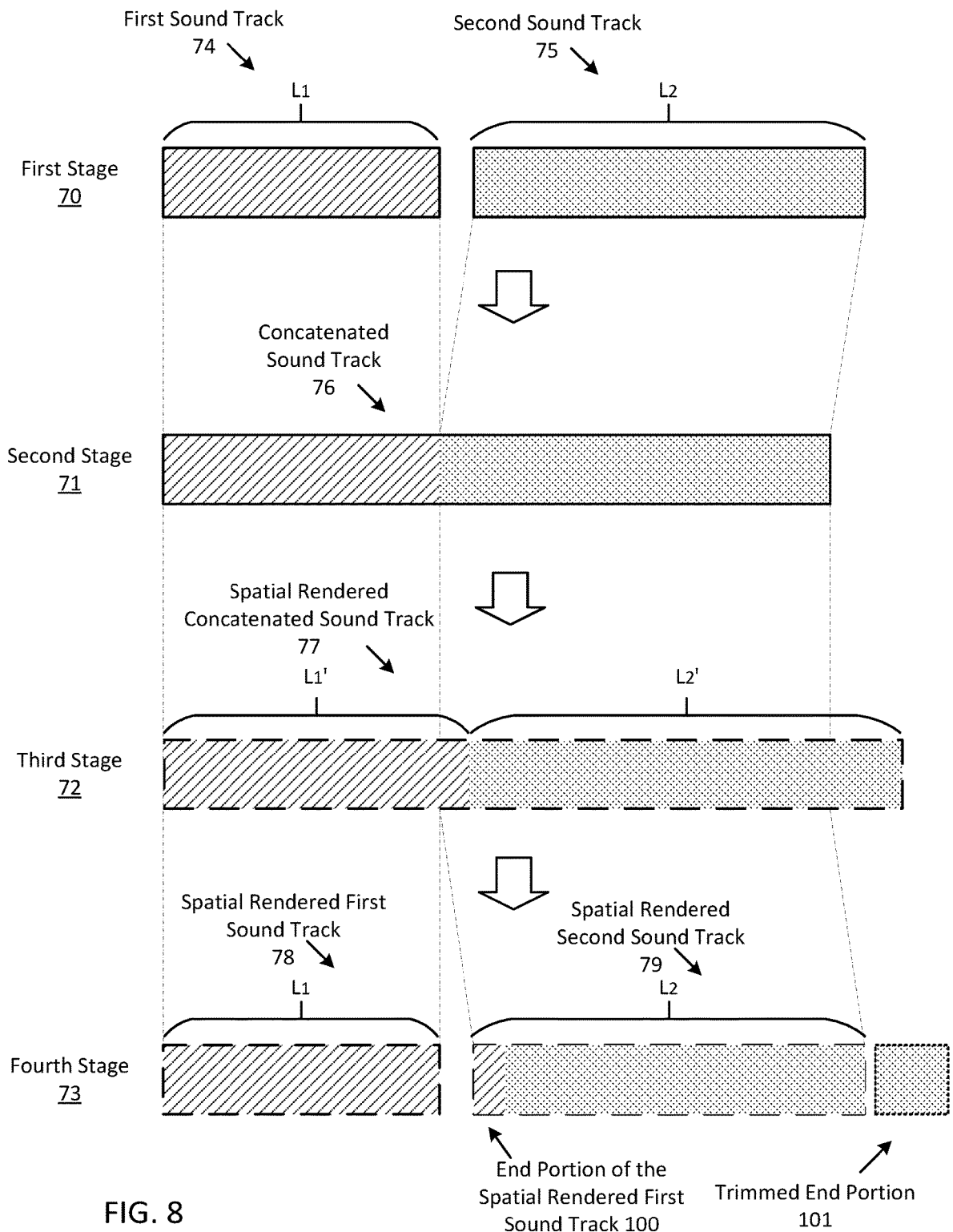
FIG. 8 illustrates several stages for maintaining track length of a spatial rendered concatenation of sound tracks according to some aspects.

FIG. 8 illustrates four stages 70-73 for maintaining track length of a spatially rendered concatenation of sound tracks (e.g., as described in process 40 of FIG. 4) according to some aspects. The first stage 70 shows a first sound track 74 with a first track length, $L_1$, and shows a second sound track 75 with a second track length, $L_2$. In one aspect, these tracks may be a part of an order of sound track, such as tracks that are a part of an audio album. In which case, the first sound track 74 may be the first track in the album, and the second sound track 75 may be the second track of the album. The second stage 71 shows the result of both sound tracks being combined, as a concatenated sound track 76 (or a concatenation of the first and second sound tracks), whereby the second sound track is added to the end of the first sound track. Thus, the length of the concatenated track may be $L_1+L_2$.

The third stage 72 shows a spatially rendered concatenated sound track 77. Specifically, this stage is illustrating the result of spatial rendering (and/or performing one or more additional audio signal processing operations, as described herein, upon) the concatenation of sound tracks, as describe in block 43 of FIG. 4. As shown, the length of the both sound tracks have been extended, and therefore the length of rendered concatenated sound track has been extended as well due to the rendering. In particular, the track length of a portion of the rendered concatenated sound track that is associated with the first sound track has increased to $L_1'$, and similarly, the track length of the other portion of the rendered concatenated sound track that is associated with the second sound track has increased to $L_2'$.

The fourth stage 73 shows the result of separating concatenated sound track 77 in two spatially rendered sound tracks, 78 and 79. Specifically, this stage shows how the rendered sound tracks 78 and 79 have been separated such that both sound tracks have the same respective track lengths as their corresponding original sound tracks 74 and 75. For instance, when separating the concatenated sound track, the server software program 23 may begin at the first sound track and separate a first portion of the concatenated sound track 77 between a beginning of the track to $L_1$ to create track 78. From $L_1$, the server software program may separate a second portion between $L_1$ and $L_2$ to create track 79. As shown, since the rendered track 78 extended beyond $L_1$, the end portion of the spatially rendered first sound track 100 is a beginning portion of the rendered second sound track 79. In one aspect, the server software program 23 may trim an end portion of the last rendered sound track separated from the concatenated sound track 77, as described herein. Here, the last track is track 79, and therefore the end portion 101 has been trimmed such that the second sound track 79 has length $L_2$.

Figure 9:
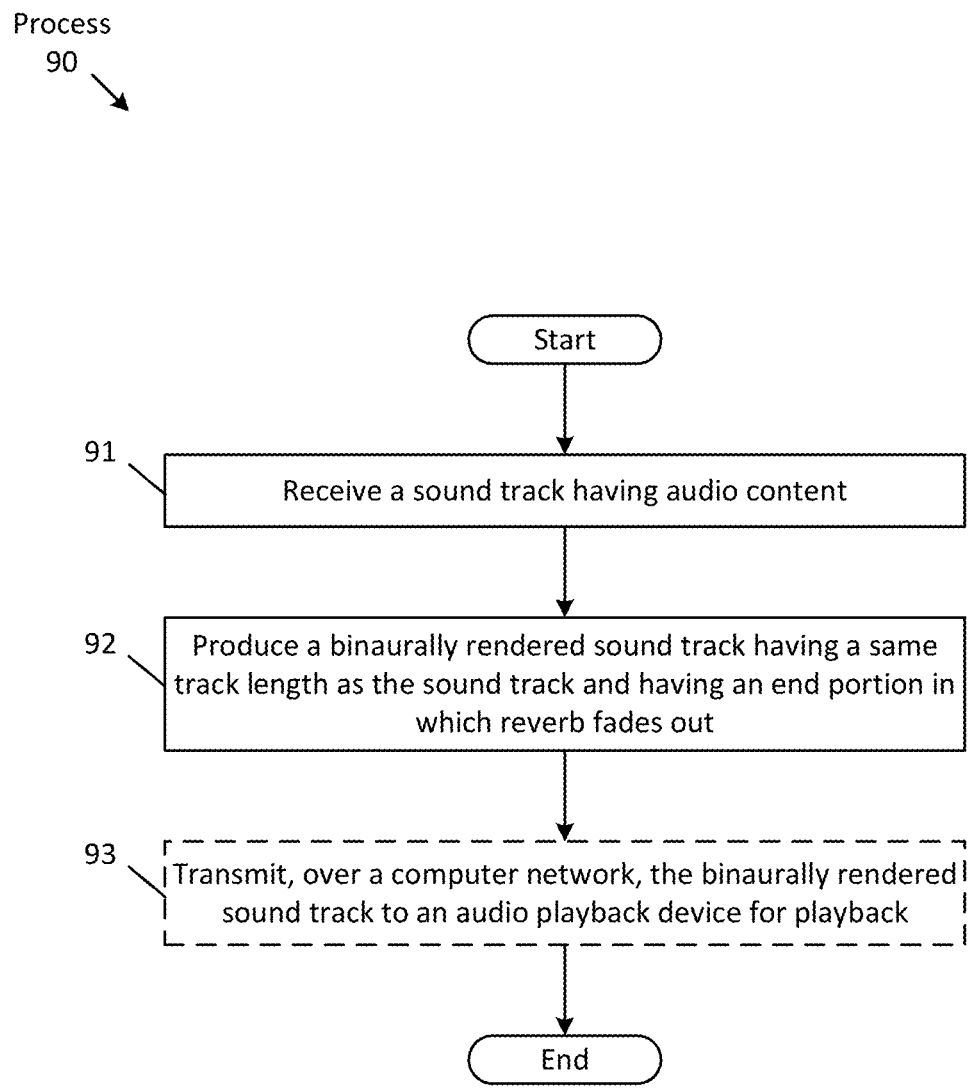
FIG. 9 is a flowchart of a process for maintaining track length of a spatially rendered sound track according to one aspect.

FIG. 9 is a flowchart of a process 90 for maintaining track length of a spatially rendered sound track according to one aspect. The process 90 begins by (e.g., the server software program 23 of the) server 5 receiving a sound track having audio content (at block 91). As described herein, the sound track may have any type of audio content in any type of audio format. In one aspect, the server receives the sound track in response to receiving a request for a spatially rendered version of the sound track, as described herein. The server produces a binaurally rendered sound track having a same track length as the sound track and having an end portion in which reverb fades out (at block 92). In particular, the server may apply a HRTF to the sound track to produce the binaurally rendered sound track. The server may apply reverb to the binaurally rendered sound track, and fade out the end portion of the binaurally rendered sound track. For example, the server may begin to fade out the reverb at a time along the track length of the rendered track that is before an end time of the original track. In one aspect, the reverb may be reduced with respect to time. For example, the server may reduce (e.g., gain of the) reverb linearly with respect to time from the time along the track length that is before the end time. In one aspect, the server may perform the fading out operation such that any reverb tail added by the application of reverb is removed. In one aspect, the server may fade out the reverb after it is applied to the track. In another aspect, the server may fade out the reverb as it is applied to the track.

In one aspect, the binaurally rendered sound track of which reverb has been faded out may still have an extended track length with respect to the original track's length. For example, as described herein, the application of the HRTF may extend the track length due to reverb that is reflected in the HRTF. Thus, when a sound track is binaurally rendered and reverb is added, will have a first extended end portion due to reverb tail added by the HRTF and a second extended end portion due to reverb tail added by the reverb. With the fading out of the reverb, the second extended end portion may be reduced (or eliminated). As a result of having the first extended end portion the server may trim that portion (cutting it off), resulting in the binaurally rendered sound tracking having the same track length as the original. The server transmits, over a computer network, the binaurally rendered sound track to an audio playback device for playback (at block 93).

In one aspect, at least some of the operations described herein may be performed in response to determining that the track length of the binaurally rendered sound track has a signal level that is greater than a signal threshold level. For example, in response to determining that a signal level of an end portion (which extends beyond the original track length) is greater than a threshold level, the server may be configured to reduce the end portion by fading out a portion of applied reverb upon the rendered sound track (e.g., fading out reverb staring at a time along the extended track length). As described herein, the end portion may still extend beyond the original track length due to the applied HRTF. Thus, the server may trim off the reduced end portion, as described herein.

As described thus far, the operations may be performed by the (e.g., server software program 23 of the) audio content server 5. In another aspect, at least some of the operations may be performed by another electronic device, such as the audio playback device 2, shown in FIG. 2.

In one aspect, a method performed by a programmed processor of an electronic server includes receiving an ordered plurality of sound tracks of an audio album, each sound track having a respective track length; combining the ordered plurality of sound tracks to form a concatenation of sound tracks; spatially rendering the concatenation of sound tracks, wherein the spatially rendering causes at least one of the sound tracks of the concatenation to have an extended track length; and separating the spatially rendered concat- enation of sound tracks to form an ordered plurality of spatially rendered sound tracks, each having the respective track length of its corresponding sound track of the ordered plurality of sound tracks, wherein a beginning portion of a spatially rendered sound track is an end portion of a previous spatially rendered sound track that extended beyond its respective track length while both spatially rendered sound tracks were a part of the concatenation.

In another aspect, the previous spatially rendered sound track is a first spatially rendered sound track and the spatially rendered sound track is a second spatially rendered sound track, wherein both the first and second spatially rendered sound tracks have extended track lengths that make up a length of the spatially rendered concatenation, wherein separating the spatially rendered concatenation of sound tracks comprises cutting along the length of the spatially rendered concatenation at a time that corresponds to an end time of a respective track length of a sound track of the ordered plurality of sound tracks that corresponds to the first spatially rendered sound track. In some aspects, separating the spatially rendered concatenation of sound tracks comprises fading out a last spatially rendered sound track separated from the concatenation at a time along its respective extended track length that corresponds to an end time of a corresponding sound track of the ordered plurality of sound tracks. In another aspect, the electronic server performs one or more signal processing operations upon the concatenation, wherein the extended track lengths of the at least some of the sound tracks are at least partially based on the performed operations. In one aspect, the one or more signal processing operations comprises applying reverb and performing equalization operations.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations, spatial rendering operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an audio system, the method comprising:
   receiving a sound track that has a track length;
   producing a binaural audio version of the sound track, the binaural audio version having an extended track length;
   performing a fading operation upon the binaural audio version to gradually reduce a signal level of the binaural audio version to below a signal threshold level at a time along the extended track length that corresponds to an end time of the track length of the sound track; and
   storing the binaural audio version having the track length of the sound track in memory for later transmission to an audio playback device for driving one or more speakers.

2. The method of claim 1, wherein producing the binaural audio version comprises applying a predefined head-related transfer function (HRTF) that is not personalized for a user of the audio playback device.

3. The method of claim 1, wherein the signal threshold level is a first signal threshold level, wherein the method further comprises:
   determining whether a signal level of a portion of the binaural audio version exceeds a second signal threshold level; and
   in response to determining that the signal level of the portion exceeds the second signal threshold level, applying dynamic range compression based on a difference between the signal level of the portion and the second signal threshold level.

4. The method of claim 3, wherein the second signal threshold level is 0 decibels relative to full scale (dBFS).

5. The method of claim 1 further comprising applying reverb to the binaural audio version of the sound track, wherein the extended track length is at least partially based on the applied reverb.

6. The method of claim 5, wherein performing the fading operation comprises fading out a portion of the applied reverb on the binaural audio version of the sound track.

7. The method of claim 1 further comprising, upon performing the fading operation, trimming an end portion of the binaural audio version of the sound track that begins at the time along the extended track length that corresponds to the end time of the track length of the sound track so that both the sound track and the binaural audio version have a same track length.

8. The method of claim 1 further comprising:
   receiving, over a computer network, a request from the audio playback device to stream the binaural audio version of the sound track;
   retrieving the binaural audio version of the sound track from memory; and
   transmitting, over the computer network, the binaural audio version of the sound track to the audio playback device.

9. A method performed by a programmed processor of an electronic server, the method comprising:
   receiving a sound track having a track length;
   applying a head-related transfer function (HRTF) upon the sound track to produce a binaurally rendered track that has an extended track length;
   determining whether a signal level of an end portion of the binaurally rendered track that exceeds beyond the track length of the sound track is below a signal threshold level; and
   in response to the signal level of the end portion being below the signal threshold level, trimming the end portion off of the binaurally rendered track.

10. The method of claim 9, wherein determining whether the signal level of the end portion is below the signal threshold level comprises determining whether an end portion of the binaurally rendered sound track that exceeds the track length of the sound track is below the signal threshold level.

11. The method of claim 9, wherein determining whether the signal level of the end portion is below the signal threshold level comprises determining whether the end portion of the binaurally rendered track that begins at a time that corresponds to an end time of the sound track remains below the signal threshold level along its track length.

12. The method of claim 9 further comprising applying reverb to the binaurally rendered track, wherein the extended track length of the binaurally rendered track is at least partially based on the applied reverb and the applied HRTF.

13. The method of claim 12 further comprising, in response to the signal level of the end portion not being below the signal threshold level,
   reducing the end portion of the binaurally rendered track by fading out a portion of the applied reverb upon the binaurally rendered track; and
   trimming off the reduced end portion such that the binaurally rendered track has a same track length as the sound track.

14. The method of claim 9 further comprising, in response to the signal level of the end portion not being below the signal threshold level, fading out the binaurally rendered track at a time along the extended track length that corresponds to an end time of the track length of the sound track.

15. The method of claim 9, wherein the signal threshold level is a first signal threshold level, wherein the method further comprises:
   determining whether a signal level of a portion of the binaurally rendered track exceeds a second signal threshold level; and
   in response to determining that the signal level of the portion exceeds the second signal threshold level, applying dynamic range compression based on a difference between the signal level of the portion and the second signal threshold level.

16. The method of claim 15, wherein the second signal threshold level is 0 decibels relative to full scale (dBFS).

17. A method comprising:
   receiving a sound track having audio content;
   producing a binaurally rendered sound track having a same track length as the sound track and having an end portion in which reverb fades out; and
   transmitting, over a computer network, the binaurally rendered sound track to an audio playback device for playback.

18. The method of claim 17, wherein producing the binaurally rendered sound track comprises:
   applying a head-related transfer function (HRTF) to the sound track to produce the binaurally rendered sound track;

applying reverb to the binaurally rendered sound track; and fading out the end portion of the binaurally rendered sound track.

19. The method of claim 18, wherein the faded out end portion is a first end portion, wherein the binaurally rendered sound track comprises a second end portion that begins at an end of the first end portion, wherein the method further comprises trimming the second end portion off of the binaurally rendered sound track.

20. The method of claim 17 further comprises receiving, over the computer network, a request from the audio playback device to stream the binaurally rendered sound track, wherein the binaurally rendered sound track is transmitted in response to the request.

* * * * *